INVENTORS
Joseph Rojek
Joseph Csoke

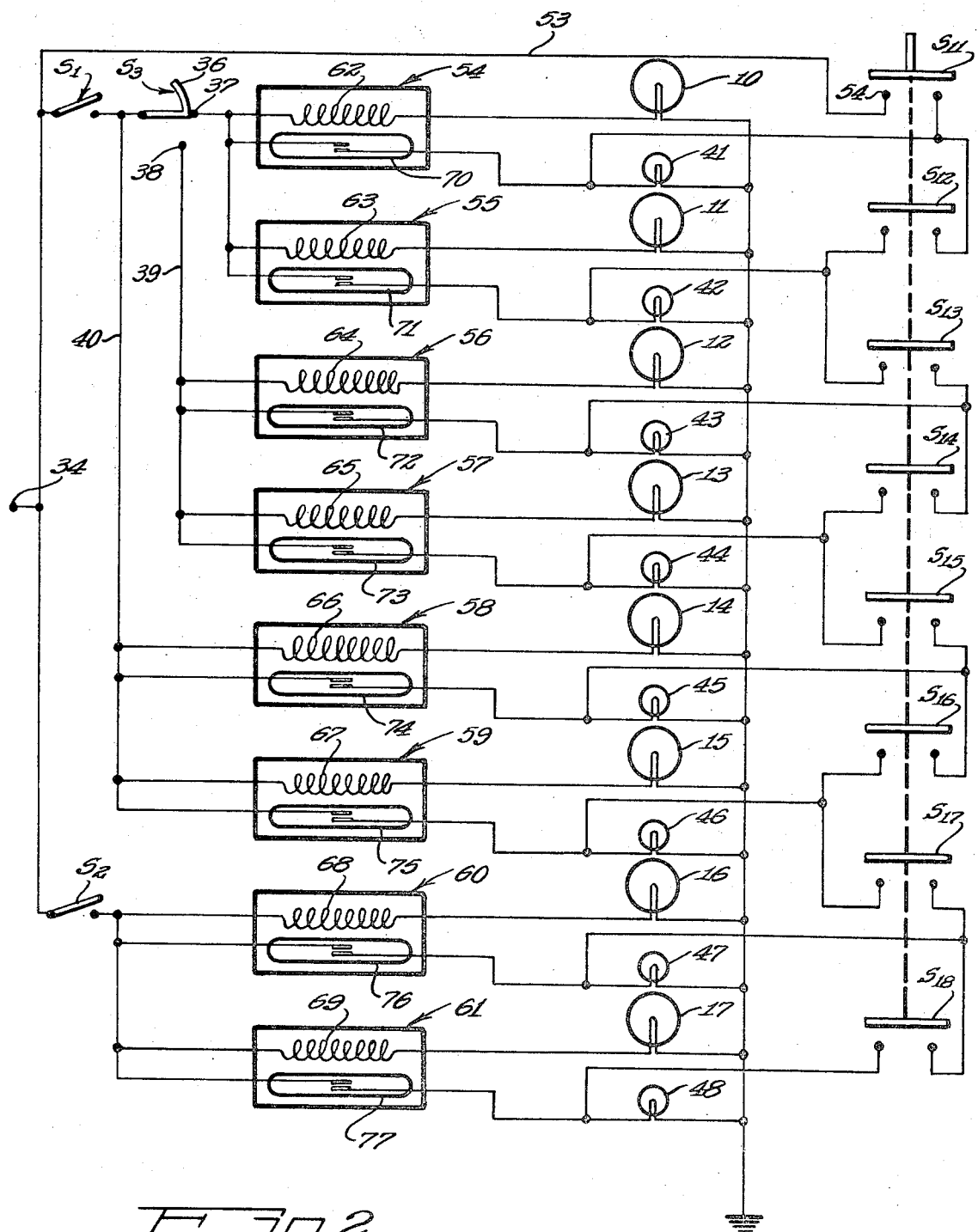

United States Patent Office 3,546,687
Patented Dec. 8, 1970

3,546,687
LAMP FAILURE INDICATOR
Joseph Rojek, 7925 S. Lorel, Oak Lawn, Ill. 60459,
and Joseph Csoke, 9336 Avalon, Chicago, Ill. 60619
Filed Oct. 17, 1967, Ser. No. 675,971
Int. Cl. G08b 21/00, 29/00
U.S. Cl. 340—214                    2 Claims

ABSTRACT OF THE DISCLOSURE

Monitoring apparatus for indicating the condition of a plurality of electrical lamps and includes an indicator lamp test circuit for simultaneously testing all indicator lamps. Each electrical lamp has a lamp failure indicator circuit kit including a reed switch responsive to current in existing lamp wiring, and which is connected to control an indicator.

As automobiles have become faster and faster, it has become more and more necessary that proper lighting equipment be mounted on the automobile for safety purposes. Many accidents occur due to the failure of headlights where an approaching vehicle is confused and collisions occur.

It is an object of the present invention therefore, to provide a novel monitoring system for the lighting system of a vehicle so as to positively indicate to the operator of the vehicle whether the lights are operating properly.

Yet another object of the invention is to provide a novel warning system for an operator of a vehicle so that he has a positive method of determining that his illumination system is properly operating.

A feature of this invention is found in the provision for a system that may be connected in circuit with the existing electrical system of an automobile so that a portion of the existing wiring of the automobile is utilized.

Another feature of this invention relates to an indicator system which can be mounted into the existing system of an automobile and which will indicate when any lights are out.

Further features, objects and advantages of this invention will become apparent from the following description and claims when read in view of the drawings in which:

FIG. 1 illustrates a warning system according to this invention wherein the warning lights are normally off if a particular light being monitored is on.

FIG. 2 is a modification of the invention in which the warning indicator lights are normally on and go off upon failure of a particular light being monitored.

Figure 1:
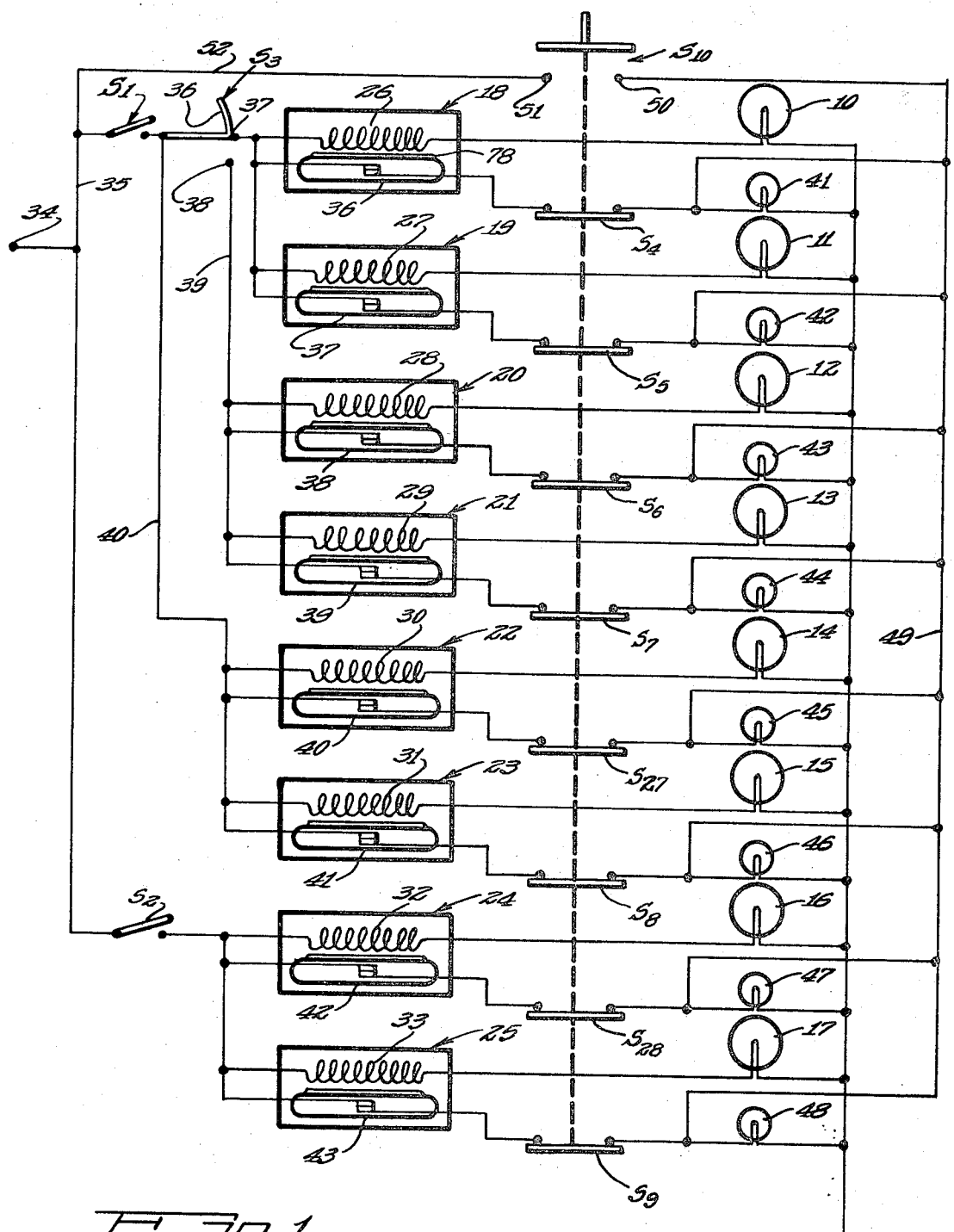

FIG. 1 illustrates various lights of a vehicle such as an automobile, which are to be monitored by this invention. For example, bulbs 10 and 11 are the low beam headlights of the vehicle. Bulbs 12 and 13 are the high beam headlights. Bulbs 14 and 15 are tail lights and bulbs 16 and 17 are stop lights. One side of all the lights 10 through 17 are connected together and to ground which is normally the frame of the vehicle. The other side of each light 10 through 17 is connected to an energizing coil 26–33 of reed switches 18–25.

A terminal 34 is connected to the hot side of the battery and is connected by a lead 35 to a headlight switch $S_1$ which turns on the headlights and tail lights of the vehicle. It is to be noted energizing coils 26–31 carry current when the high and low beam headlights and tail lights are on. Likewise, terminal 34 is connected to a brake light switch $S_2$ and coils 32 and 33 are energized when the brake switch turns on the stop lights 16 and 17.

The reed switches 18–25 are available on the market and may be normally closed when current does not pass through their coils 26–33, but which open when coils 26–33 are energized. The switches might be, for example, type B General Electric switches which are standard available switches. An applied magnetic field opens the contacts 36–43 of the switches. The contacts 36–43 are mounted in glass envelopes and a magnetic field causes the circuit to be opened through the contacts 36–43.

A foot dimmer switch $S_3$ has its movable contact 36 connected to the on-off switch $S_1$. A first contact 37 of switch $S_3$ is connected to the low beam reed switches 18 and 19. When the switch contact 36 is moved to the high beam position it engages both contact 37 and a second contact 38. Contact 38 is connected by lead 39 to reed switches 20 and 21.

The tail lights 14 and 15 are connected through reed switches 22 and 23 by lead 40 to switch $S_1$.

The stop lights 16 and 17 are connected to reed switches 24 and 25 and to the brake switch $S_2$.

Indicator lights 41–48 are associated with each light 10–17 and have one of their terminals connected to ground. Their other sides are connected through normally closed switches $S_4$, $S_5$, $S_6$, $S_7$ $S_{27}$, $S_8$, $S_{28}$, and $S_9$ to switch contacts 36–43, respectively.

A testing circuit comprises a lead 49 connected to the ungrounded side of each of indicators 41–48 and to a normally open contact 50 of a switch $S_{10}$. A second contact 51 of switch $S_{10}$ is connected by lead 52 to hot terminal 34.

To assure that all the indicator lights 41–48 are good, switch $S_{10}$ is closed. Switch $S_{10}$ is mechanically coupled to switches $S_4$, $S_5$, $S_6$, $S_7$, $S_{27}$, $S_8$, $S_{28}$ and $S_9$ to open them when it is closed. Power is supplied through switch $S_{10}$ and lead 49 to the indicators 41–48 and if they are good they light. Thus, the user knows if the bulbs are good. Any faulty bulbs are replaced and the switch $S_{10}$ is opened thereby closing switches $S_4$, $S_5$, $S_6$, $S_7$, $S_{27}$, $S_8$, $S_{28}$ and $S_9$.

Since all the circuits operate in a similar manner, operation of only one will be described in detail. When the switch $S_1$ is closed, reed switch 18 will have its coil 26 energized which will open contacts 36. The headlight 10 will be turned on and indicator 41 will be off. In the event headlight bulb burns out, its filament will be open and no current will flow through coil 26. When this occurs, contacts 36 will close and indicator 41 will be turned on. The indicators 41–48 are mounted so that the operator of the vehicle may see them and they are identified, so if any indicator goes on the operator knows which of the vehicle lights are out.

Thus, if an indicator light goes on when the light it monitors is supposed to be on, the operator immediately knows it and can stop the vehicle and have the light repaired.

FIG. 2 illustrates a standard model of the invention in which reed switches 54–61, which have coils 62–69 and contacts 70–77, are normally open when the coils are not energized. These may be type A General Electric reed switches, for example. The contacts are closed when the coils 62–69 are energized. With this embodiment the indicators 41–48 are on when the headlights, tail lights or stop lights are on and working properly and go off when current through one of the coils 62–69 is interrupted by failure of a bulb being monitored. When this occurs, the operator knows the associated bulb has failed and stops the vehicle and makes repairs.

For test purposes, a lead 53 is connected to hot terminal 34 and to the first contact 54 of switch $S_{11}$. $S_{11}$ applies power to the ungrounded side of indicator 41. Likewise switches $S_{12}$–$S_{18}$ apply power to indicators 42–48 when closed. Switches $S_{11}$–$S_{18}$ are mechanically linked together so that they close together and the operator may test the indicators 41–48 by closing them.

Both modifications of the invention will indicate proper operation of each individual light in the vehicle to which the test system is connected. It is to be realized that the system according to the invention as disclosed in FIGS. 1 and 2, may be mounted at the factory when the vehicle is constructed. In this event, the various components such as indicator lights, the energizing coils and the reed switches may be suitably packaged for such installation.

This invention may be mounted in a completed vehicle by using the existing wiring to form the coils 26–33 or 62–69. The switch elements 36–43 or 70–77 may be purchased separately and the coils 26–33 or 66–69 formed by winding from slack existing in the vehicle's wiring. In other words, the coil 26, for example, may be formed by the installer from slack in the wiring associated with light 10 and the switch element 36 may be mounted so that the coil thus formed will actuate it. This allows an inexpensive installation in vehicles.

It is seen that this invention provides a new and novel indicating system utilizing reed switches. Although the invention has been described with respect to preferred embodiments, it is not to be so limited, as changes or modifications may be made therein which are within the full intended scope of the invention as defined by the appended claims.

We claim as our invention:

1. A monitoring apparatus for indicating the condition of a plurality of electrical lamps and including a test circuit for indicators comprising:
   (a) a plurality of reed switches each with an energizing coil and pairs of contacts which are controlled by the energizing coils and each of the energizing coils connected in circuit with one of the plurality of lamps to be monitored,
   (b) a plurality of indicators each connected in circuit with the contacts of a respective reed switch so as to indicate the condition of lamps that are monitored,
   (c) an on-off switch connected in series with the energizing coils of said reed switches,
   (d) means for testing said indicators comprising a plurality of switches with first and second stationary contacts and movable contacts to bridge said first and second stationary contacts, said first and second stationary contacts connected together so that a series circuit is provided when said movable contacts bridge said first and second stationary contacts, the first stationary contact of the first one of said plurality of switches connected to a terminal side of a power supply of said on-off switch, one of each of said plurality of indicators connected between the second stationary contact of each of said plurality of switches and another terminal side of said power supply, and said movable contacts linked together so that they are closed simultaneously.

2. A monitoring apparatus for indicating the condition of a plurality of electrical lamps and including a test circuit for indicators according to claim 1 wherein said energizing coils of said reed switches are formed from the existing wiring of the vehicle.

References Cited

UNITED STATES PATENTS

| | | | |
|---|---|---|---|
| 2,947,980 | 8/1960 | Lemm et al. | 340—214 |
| 3,312,967 | 4/1967 | Levine | 340—253 |
| 3,457,561 | 7/1969 | Zeisler | 340—251 |
| 2,197,838 | 4/1940 | Reno | 340—251 |
| 2,595,246 | 5/1952 | Grant, Jr., et al. | 340—252 |
| 3,171,096 | 2/1965 | Murray et al. | 340—251 |
| 3,250,950 | 5/1966 | Reiche | 340—80 |
| 3,252,137 | 5/1966 | Montgomery | 340—251 |
| 3,355,708 | 11/1967 | Perry | 340—251 |

THOMAS B. HABECKER, Primary Examiner

D. MYER, Assistant Examiner

U.S. Cl. X.R.

340—251